UNITED STATES PATENT OFFICE.

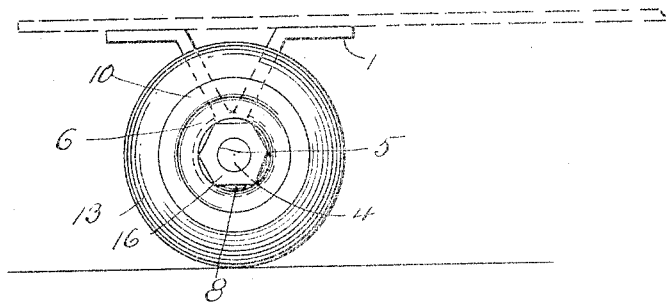
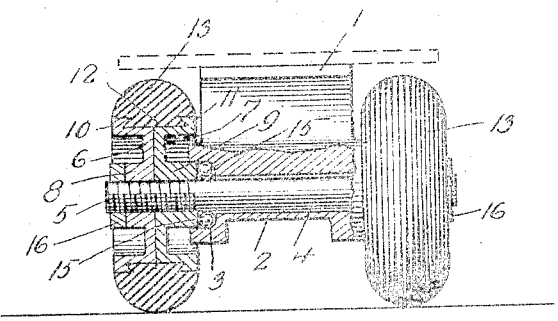
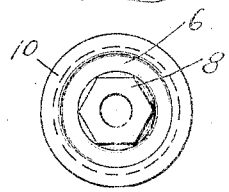
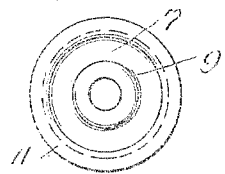

EMORY H. COPENHAVER AND WALTER COLVIN, OF DUNLEVY, PENNSYLVANIA.

ROLLER-SKATE.

No. 882,999.  Specification of Letters Patent.  Patented March 24, 1908.

Application filed December 18, 1907. Serial No. 407,039.

*To all whom it may concern:*

Be it known that we, EMORY H. COPENHAVER and WALTER COLVIN, citizens of the United States of America, residing at Dunlevy, in the county of Washington and State of Pennsylvania, have invented certain new and useful Improvements in Roller-Skates, of which the following is a specification, reference being had thereon to the accompanying drawing.

This invention relates to roller skates, and more particularly to the wheel of a skate.

The primary object of our invention is to provide a noiseless roller skate, which is accomplished by using rubber tired wheels and ball bearings, the construction of these wheels being our invention.

We construct a roller skate wheel of two metallic parts or disks braced and stamped to provide hub portions and rim portions, the parts of the wheel being fixed upon an axle, whereby the rim portions will firmly grip a resilient tire.

The detail construction entering into our invention will be presently described and then specifically pointed out in the appended claims.

In the drawings: Figure 1 is an elevation of a wheel constructed in accordance with our invention, Fig. 2 is a vertical sectional view of a wheel as mounted upon the axle of a skate, Fig. 3 is an elevation of the outer part or disk of the wheel, and Fig. 4 is a similar view of the inner part or disk.

In the accompanying drawings, 1 designates a portion of a skate having an axle bearing 2 provided with ball races or sockets 3. Revolubly mounted in the bearing 2 is an axle 4 having threaded ends 5. Mounted upon the threaded ends of the axle are our improved wheels, each wheel comprising an outer part or disk 6 and an inner part or disk 7. These parts or disks are formed with hub portions 8 and 9, and with rim portions 10 and 11. The rim portions 10 and 11 are somewhat similar to the "clencher" type of tire fastener, said portions providing a circumferential dove-tail shaped groove for receiving a dove-tail shaped tongue 12 of a resilient tire 13, preferably constructed from rubber. The hub portion 9 of the inner part or disk 7 extends into the race or socket 3. In the ball race or socket 3 is mounted a plurality of anti-friction balls 15, these balls insuring a free and easy movement of the axle 4 in the bearing 2. To retain the parts or disks 6 and 7 together upon the threaded end of the axle 4, we employ a nut 16.

It will be observed that our wheel consists of comparatively few parts that can be easily and quickly assembled and disassembled, when it is desired to renew the tires.

We reserve the right to make such changes in the details of construction as are permissible by the appended claims.

Having now described our invention what we claim as new, is:—

The combination with a roller skate bearing, and an axle extending therethrough, of wheels fixed upon the ends of said axle, each wheel comprising an outer part and an inner part, ball bearings arranged between said skate bearing and the inner parts of said wheels, each part having a hub portion and a rim portion, the rim portions of said wheels providing a circumferential dove-tail shaped groove, a resilient tire fitting upon said rim groove, and having a dove-tail shaped tongue engaging in the groove provided therefor, substantially as described.

In testimony whereof we affix our signatures in the presence of two witnesses.

EMORY H. COPENHAVER.
WALTER COLVIN.

Witnesses:
  H. H. RIGGLE,
  HENRY O. SAM.